US008297923B2

(12) United States Patent
Janssen

(10) Patent No.: US 8,297,923 B2
(45) Date of Patent: Oct. 30, 2012

(54) DEVICE FOR UTILIZING THE KINETIC ENERGY OF FLOWING WATER

(76) Inventor: Kai-Ude Janssen, Wolfsburg (DE)

( * ) Notice: Subject to any disclaimer, the term of this patent is extended or adjusted under 35 U.S.C. 154(b) by 807 days.

(21) Appl. No.: 11/568,498

(22) PCT Filed: Apr. 13, 2005

(86) PCT No.: PCT/EP2005/003868
§ 371 (c)(1),
(2), (4) Date: Jan. 24, 2007

(87) PCT Pub. No.: WO2005/108780
PCT Pub. Date: Nov. 17, 2005

(65) Prior Publication Data
US 2008/0014089 A1   Jan. 17, 2008

(30) Foreign Application Priority Data

May 8, 2004  (DE) .................. 10 2004 022 844

(51) Int. Cl.
F03B 7/00 (2006.01)
(52) U.S. Cl. ............... 416/6; 416/117; 416/119
(58) Field of Classification Search ............ 290/43, 290/54; 415/4.1, 906; 416/17, 110, 111, 416/153, 203, DIG. 4, 119, 6, 117
See application file for complete search history.

(56) References Cited

U.S. PATENT DOCUMENTS

| 113,284 | A | * | 4/1871 | Folsom | 416/119 |
| 302,769 | A | * | 7/1884 | Pallausch | 416/119 |
| 181,974 | A | | 8/1931 | Jenkins | |
| 2,513,136 | A | * | 6/1950 | Borsos | 60/496 |
| 3,912,937 | A | * | 10/1975 | Lesser | 290/43 |
| 3,978,345 | A | * | 8/1976 | Bailey | 290/54 |

(Continued)

FOREIGN PATENT DOCUMENTS

DE   10061450   7/2002

(Continued)

OTHER PUBLICATIONS

Hambley, Allan R., Electrical Engineering: Principles and Applications, 1997 Prentice Hall.*

(Continued)

Primary Examiner — Richard Edgar
Assistant Examiner — Sean J Younger
(74) Attorney, Agent, or Firm — Andrew M. Calderon; Roberts Mlotkowski Safran & Cole, P.C.

(57) ABSTRACT

A device for utilizing the kinetic energy of flowing water with several pressure surfaces rotating around a common rotor axis. The pressure surfaces can be pivoted around axes arranged parallel to and spaced from the rotor axis, in particular for the production of energy from tidal currents of the sea. The pressure surfaces are attached to the pivot axes in a pendulum-like manner and stop elements for the pressure surfaces are arranged in the radial planes between the pivot axes and the rotor axis. The pivot axes of the pressure surfaces are attached by their ends to support disks radially directed towards the rotor axis. The support disks are located at the ends of the rotor axis. The support disks are embodied in at least a double-walled manner. Alternatively or additionally each pressure surface is embodied at least in a double-walled manner.

33 Claims, 3 Drawing Sheets

U.S. PATENT DOCUMENTS

| | | | |
|---|---|---|---|
| 3,986,787 A * | 10/1976 | Mouton et al. | 415/7 |
| 4,084,375 A * | 4/1978 | Horvath | 60/496 |
| 4,095,918 A * | 6/1978 | Mouton et al. | 415/7 |
| 4,151,424 A * | 4/1979 | Bailey | 290/54 |
| 4,368,392 A * | 1/1983 | Drees | 290/54 |
| 4,380,417 A * | 4/1983 | Fork | 416/108 |
| 4,408,956 A * | 10/1983 | Price, Sr. | 416/119 |
| 4,415,312 A * | 11/1983 | Brenneman | 416/119 |
| 4,467,218 A * | 8/1984 | Andruszkiw et al. | 290/54 |
| 4,520,273 A * | 5/1985 | Rowe | 290/54 |
| 4,818,888 A | 4/1989 | Lenoir | |
| 5,051,059 A * | 9/1991 | Rademacher | 415/7 |
| 6,006,518 A | 12/1999 | Geary | |
| 6,109,863 A | 8/2000 | Milliken | |
| 6,546,726 B1 * | 4/2003 | Tomoiu | 60/495 |
| 6,688,842 B2 * | 2/2004 | Boatner | 415/4.2 |
| 6,926,491 B2 * | 8/2005 | Migler | 415/4.4 |
| 7,042,113 B2 * | 5/2006 | Aukon | 290/54 |
| 7,591,635 B2 * | 9/2009 | Ryu et al. | 416/111 |
| 2003/0235498 A1 * | 12/2003 | Boatner | 416/119 |
| 2005/0017513 A1 * | 1/2005 | Sipp | 290/54 |

FOREIGN PATENT DOCUMENTS

| | | |
|---|---|---|
| FR | 524183 | 10/1919 |
| FR | 2343355 | 3/1976 |
| FR | 2405378 | 5/1979 |
| FR | 2821647 | 9/2002 |
| FR | 2494781 | 11/2980 |
| GB | 2190144 | 11/1987 |
| JP | 2002266743 A | 9/2002 |
| WO | 02070890 | 9/2002 |

OTHER PUBLICATIONS

English Translation of the Third Office Action for Japanese Patent Application No. 2007-511909, mailing date—Aug. 21, 2012, 3 pages.

* cited by examiner

DEVICE FOR UTILIZING THE KINETIC ENERGY OF FLOWING WATER

BACKGROUND OF THE INVENTION

1. Field of the Invention

The invention relates to a device for utilizing kinetic energy of flowing water with several pressure surfaces rotating around a common rotor axis (i.e., axle). The pressure surfaces can be pivoted around axes (i.e., axles) arranged parallel to and spaced from the rotor axis, in particular for the production of energy from tidal currents of the sea. The pressure surfaces are attached to the pivot axes in a pendulum-like manner and stop elements for the pressure surfaces are arranged in the radial planes between the pivot axes and the rotor axis.

2. Discussion of Background Information

Tidal power stations are hydroelectric power plants which use the potential and kinetic energy of water available through the ebb and flow of the tides for power generation. They are generally constructed at river estuaries or ocean bays. For example, a suitable bay is separated by a dam with weir and power house.

The bay is filled with a weir open at flood tide and closed at the highest water level. When the flood has receded so that a maximum head is present, the basin contents are utilized for power generation.

A device of the type mentioned at the outset can also be used in the course of a river in order to utilize the energy of the flowing water. Use in the course of a river has the advantage that a constant flow is present, so no pause times between ebb tide and flood tide need to be taken into consideration.

SUMMARY OF THE INVENTION

The invention is to a device of the type mentioned at the outset that has universal application. Moreover, the device has its own buoyancy, and can be embodied overall in a lightweight manner.

According to the invention, in a first alternative the pivot axes (i.e., axles) of the pressure surfaces are attached by their ends to support disks radially directed towards the rotor axis (i.e., axle). The support disks are located at the ends of the rotor axis. The support disks are embodied in at least a double-walled manner.

A device of the type mentioned at the outset is already shown in DE 100 61 450. The pressure surfaces present there are attached via their pivot axes to support arms extending radially from the rotor axis. According to the invention, it is now proposed to use support disks that are embodied in at least a double-walled manner instead of the support arms. The support disks have a high strength. The double-walled nature of the disks can be utilized, for example, by the injection of a gas, e.g., air, to embody the disks in a lighter manner. If the disks are made of metal and if disk cavities are not sealed from the environment, water can also penetrate into the interiors of the disks. If an electric current is applied to the disks, electrolysis processes can be initiated in the disk, through which processes oxygen can be generated in the disk. This also increases the lightness of the disk. The generation of oxygen can also be utilized to float the installation for maintenance purposes.

The embodiment of the holding elements for the pressure surfaces as a disk also improves the flow behavior of the holding elements, since a disk offers less resistance to the water than support arms separate from one another. Through the greater mechanical stability, disk diameters of, for example, 10 m can be realized. Moreover the holding elements are easier to produce. Moreover the water flow can be channeled between two disks of the device.

Pressure surfaces can be attached to a support disk from two sides. In this manner a device of the type mentioned at the outset can be embodied, which has several support disks on, e.g., one axis with a plurality of pressure surfaces. The pressure surfaces are then respectively arranged in groups, where each group is located between two support disks adjacent to one another.

According to an alternative solution of the invention for which independent protection is claimed, each pressure surface is embodied at least in a double-walled manner.

Through the double-walled embodiment of a surface element made, e.g., of metal, oxygen can also be generated through electrolysis processes in the surface element. The oxygen forming can ensure a buoyant lift, through which the surface element does not sag greatly in its pivot position on the pivot axis. The lightness of the surface element is increased, so that pivot movements triggered through the flow occur more easily.

A combination of the features essential for the invention of double-walled surface element and double-walled disks as support devices for the surface elements is possible.

According to a next further development of the invention it is provided for additional pressure surfaces to be arranged in the planes of the pressure surfaces on the sides facing away from the pressure surfaces with respect to the pivot axes. The pressure surface is thus extended beyond the pivot axis. This additional pressure surface enlarges the leading surface so that the resistance of the pressure surfaces with respect to the water flow is increased. However, the enlargement of the pressure surfaces does not impede their rotation.

As drivers for an electric generator, the devices according to the invention can be hinged on an optionally prepared foundation on the ocean floor or on a river bed with a vertically aligned as well as a horizontal rotor axis. A precise alignment, whether horizontal or vertical, is not important. The subject matter of the invention can be installed in numerous units, largely adapted to the topography of the ocean floor or river bed. An economical overall utilization through a combination of many devices installed at different geographical locations can be achieved through the relatively short shutdown time with the return of flow between water draining off and water running in in the tidal areas or through no shutdown times with an arrangement in a river bed. An economical utilization can be achieved not only with a few larger units, but also with a plurality of smaller units. The prerequisite is a largely extremely cost-effective production as a consequence of the simplest constructions and no maintenance requirement.

The subject matter of the invention shows a construction that is completely symmetrical to the rotor axis, so that provisions for improving the start-up behavior with the reversal of the flow direction of a tidal water are advantageous. These provisions should be of great technical simplicity within the framework of the overall construction, which is given through the possibility of reversing the underwater generator to engine operation to generate a starting torque acting on the rotor. The direction of rotation of the generator can be any. Alternatively, additional surfaces can be used as start-up aids. They can be attached to the outsides of the support disks distributed asymmetrically over the rotational circle.

The devices according to the invention, according to a further development, have a support frame that supports the rotor. This support frame can be attached to a foundation on the floor of the body of water, however, it is also possible to fix the support frame to the site with other attachment means. For example, it can be inserted between suspension mounts. Attachment means can also include ropes.

A simple and quick attachment of the device, e.g., in a river bed or fjord is rendered possible with the aid of these ropes. No foundation needs to be constructed, large-scale construction measures or dismantling measures upon closing are not required. The device can be mounted on a surface on which it has the most stable position. This position can then be fixed by the ropes. Low water levels can also be utilized if the arrangement of the device directly on a surface in the river bed or on the ocean floor does not cause an elevation of its arrangement. With the possibility of attaching the installation by bracing means it can also be installed in particularly deep bodies of water, e.g., in fjords. For example, it can be arranged freely suspended between fjord walls.

BRIEF DESCRIPTION OF THE DRAWINGS

Exemplary embodiments of the invention, which show further features of the invention, are shown in the drawing. They show.

DETAILED DESCRIPTION OF THE PRESENT INVENTION

Figure 1:
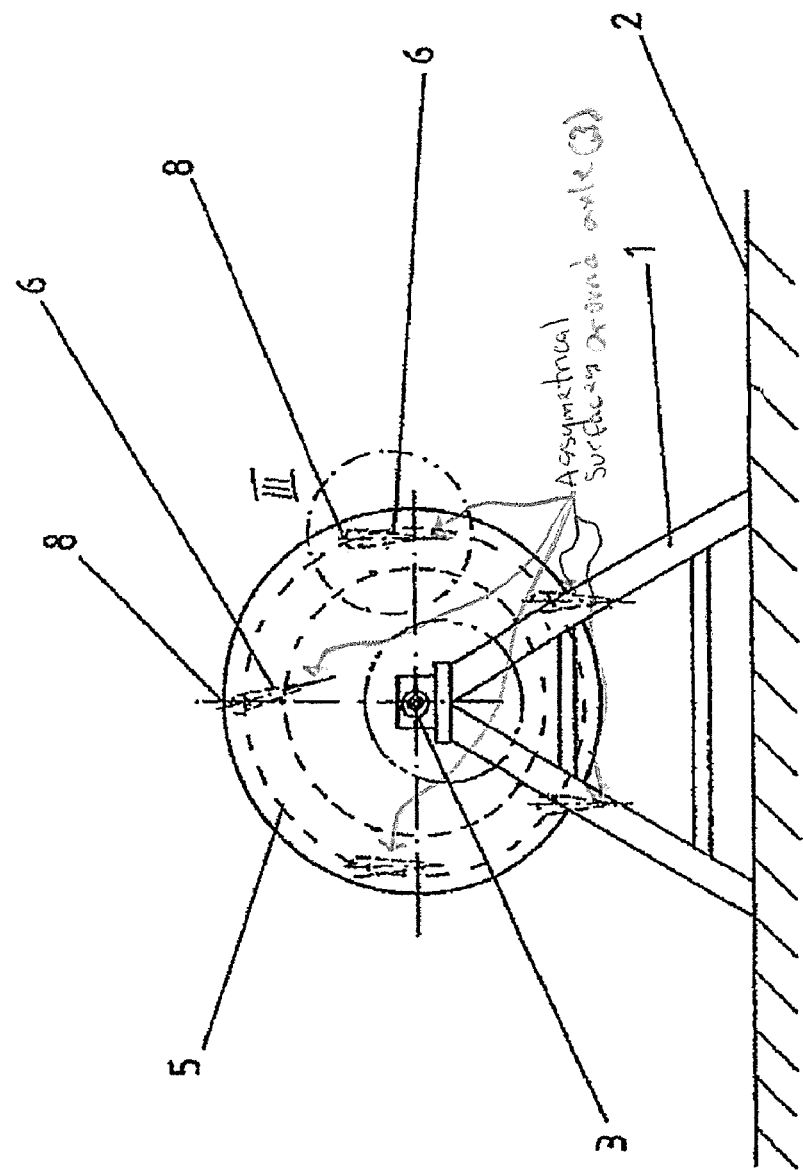
FIG. 1: A side view of a device according to the invention for utilizing the kinetic energy of flowing water.
Figure 2:
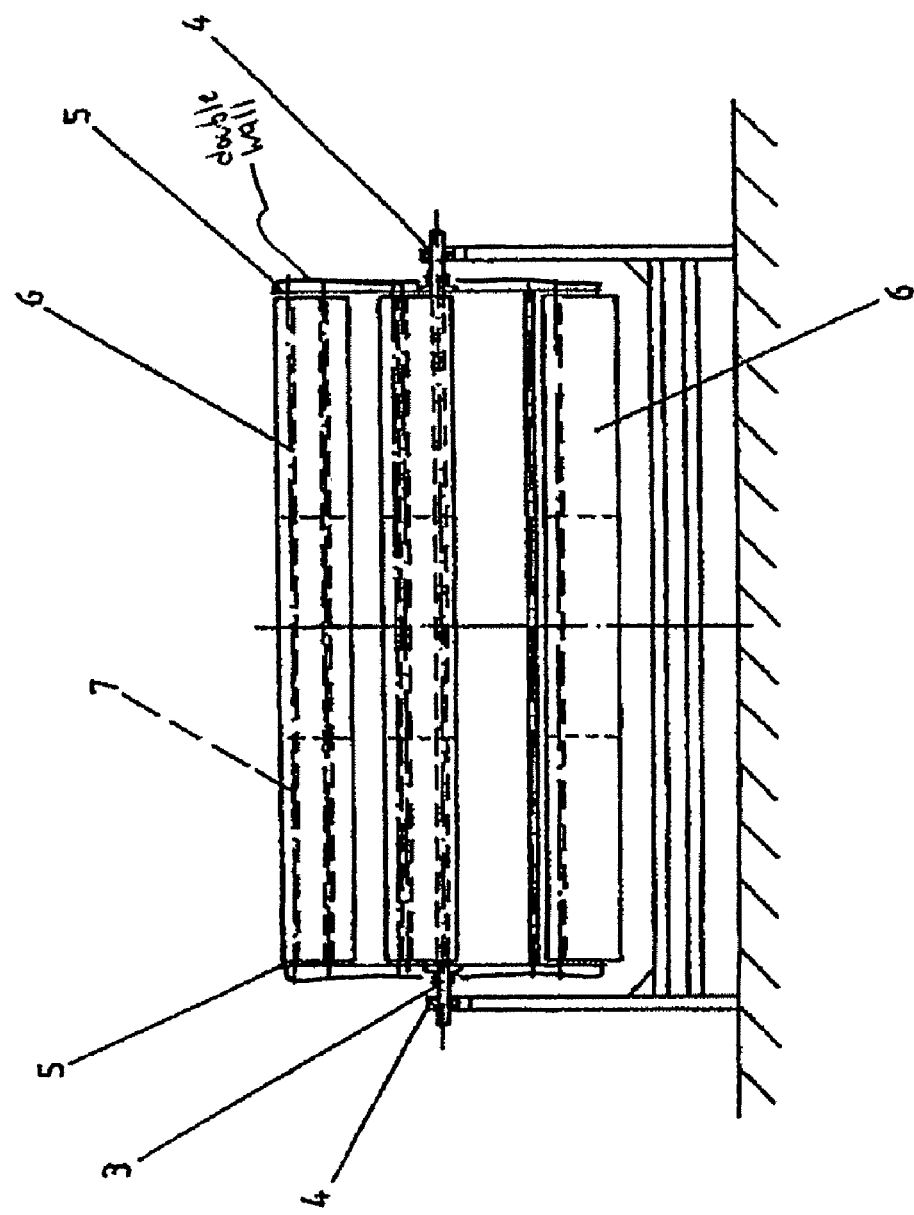
FIG. 2: A further side view of the device according to FIG. 1, and FIG. 3: A view of the detail III in FIG. 1 enlarged to scale.

The device according to the invention has a frame 1 with which can be erected on a base 2 or braced between two suspension mounts. The base 2 can be, e.g., an ocean floor or a river bed. The frame 1 is composed of several profiles connected to one another. It carries a rotor axle 3 that is supported in bearings 4. Two support disks 5 are attached to the rotor axle 3 in a torque-proof manner. Both support disks 5 are aligned parallel to one another and arranged at a spacing from one another.

The support disks 5 bear pressure surfaces 6. The pressure surfaces 6 are arranged between the support disks 5 via pivot axles 7. The pivot axles 7 are aligned perpendicular to the flat extensions of the support disks 5.

Figure 3:
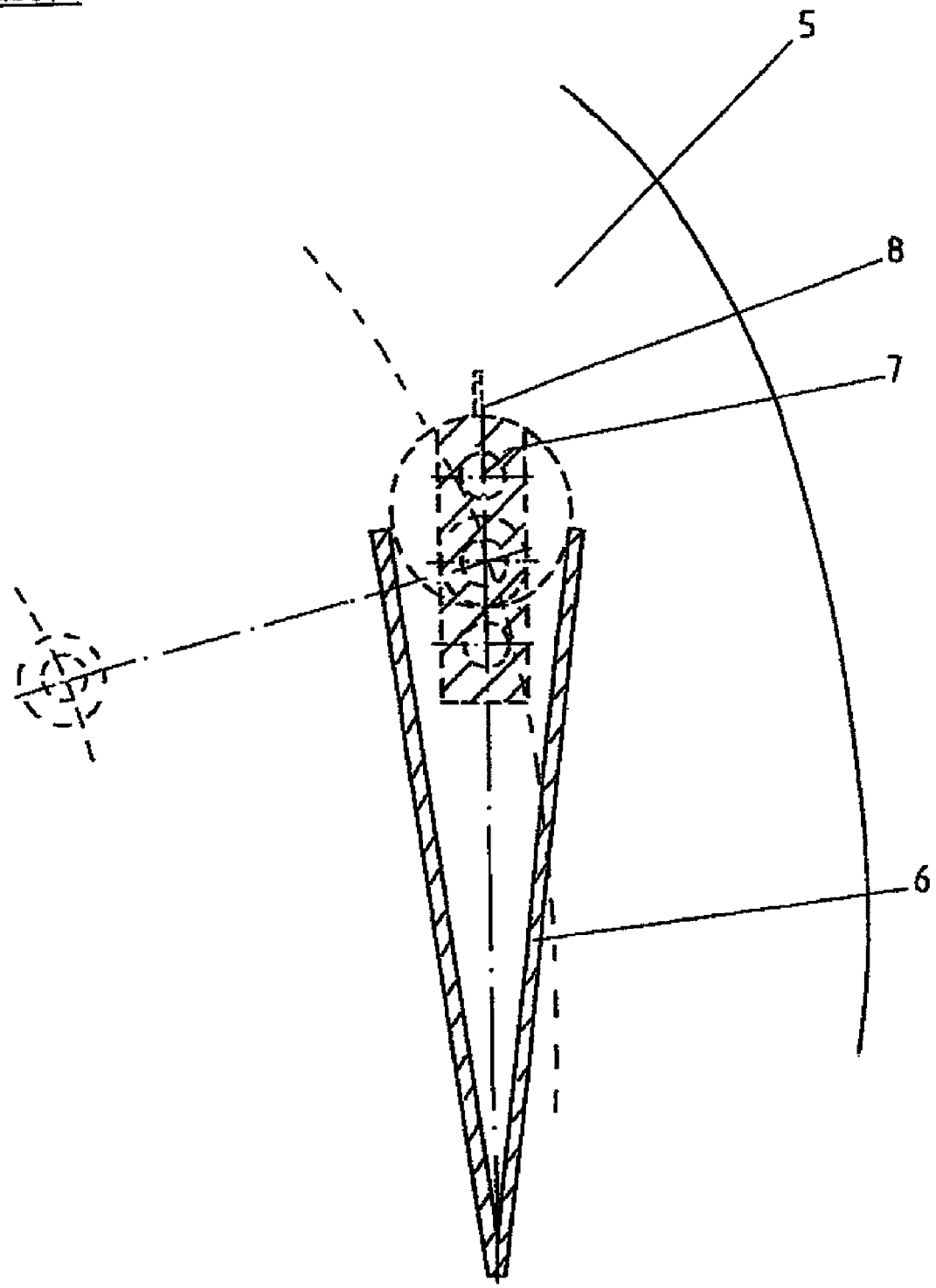

FIG. 3 shows that each pressure surface 6 has a tapered embodiment at a spacing from the pivot axle 7. FIG. 1 shows that additional pressure surfaces 8 are arranged in the planes of the pressure surfaces 6 on the sides facing away from the pressure surfaces 6 with respect to the pivot axles. FIG. 3 shows that the pressure surfaces 6 are embodied in a hollow manner.

The support disks 5 are also embodied in a hollow manner.

Ropes can be attached to the frame 1 in order to be able to fix the device, e.g., in a river bed or in a fjord.

The invention claimed is:

1. A device for utilizing kinetic energy of flowing water with several pressure surfaces rotating around a rotor axle, the pressure surfaces being pivotable around axles arranged parallel to and spaced around the rotor axle, the pressure surfaces being attached to the pivot axles in a pendulum-like manner, and stop elements for the pressure surfaces being arranged in radial planes between the pivot axles and the rotor axle, the pivot axle of the pressure surfaces being attached by their ends to support disks radially directed towards the rotor axle and the support disks being located at the ends of the rotor axle and attached thereto, such that the pivot axles of the pressure surfaces remain parallel to and maintain a same spacing around the rotor axle during rotation of the device, the support disks being embodied in at least a double-walled manner, and additional surfaces distributed asymmetrically over a rotational circle and positioned crosswise to a direction of flow on the support disk and further comprising additional pressure surfaces arranged in planes of the pressure surfaces on sides facing away from the pressure surfaces with respect to the pivot axles, the additional pressure surfaces being structured to enlarge a leading surface area comprising the pressure surfaces and the additional pressure surfaces such that resistance of the pressure surfaces is increased with respect to the flowing water.

2. A device for utilizing kinetic energy of flowing water with several pressure surfaces rotating around a rotor axle, the pressure surfaces being pivotable around axles arranged parallel to and spaced from the rotor-axle and which are structured to rotate the device in any rotation direction, the pressure surfaces being attached to the pivot axles in a pendulum-like manner, and stop elements for the pressure surfaces being arranged in radial planes between the pivot axles and the rotor axle, each pressure surface of the pressure surfaces being embodied at least in a double-walled manner forming a hollow interior, wherein the pivot axles of the pressure surfaces are attached to support disks which rotate about and attach to the rotor axle such that the pivot axles of the pressure surfaces remain parallel to and maintain a same spacing around the rotor axle during rotation of the device, the support disks being structured to have an electric current applied thereto to provide an electrolysis process through which oxygen is generated in the support disks to increase the lightness of the support disks.

3. The device according to claim 2, wherein the pivot axles of the pressure surfaces are attached by their ends to the support disks radially directed towards the rotor axle, the support disks are located at ends of the rotor axle, and the support disks are embodied in at least a double-walled manner.

4. The device according to claim 1, wherein the rotor axle is aligned horizontally.

5. The device according to claim 1, wherein the rotor axle is armature shaft of an-electric underwater generator.

6. The device according to claim 1, wherein the support disks have low-resistance flow profiles.

7. The device according to claim 5, wherein the support disks are arranged on front faces of the electric underwater generator.

8. The device according to claim 1, further comprising a support frame that carries a rotor.

9. The device according to claim 8, wherein the support frame is attached at a site with attachment means.

10. The device according to claim 9, wherein the attachment means include ropes.

11. The device according to claim 5, wherein the electric underwater generator is configured to be temporarily reversed to engine operation to produce a starting torque acting on a rotor.

12. The device according to claim 1, wherein the rotor axle is a common rotor axle.

13. The device according to claim 2, wherein the rotor axle is a common rotor axle.

14. The device according to claim 3, further comprising additional surfaces distributed asymmetrically over a rotational circle and positioned crosswise to a direction of flow on the support disk.

15. The device according to claim 3, further comprising additional pressure surfaces arranged in planes of the pressure surfaces on sides facing away from the pressure surfaces with respect to the pivot axles.

16. The device according to claim 2, wherein the rotor axle is aligned horizontally.

17. The device according to claim 2, wherein the rotor axle is an armature shaft of an electric underwater generator.

18. The device according to claim 3, wherein the support disks have low-resistance flow profiles.

19. A device, comprising
a rotor axle; and
at least one support disk having a pressure surface, the at least one support disk attached to the rotor axle which rotates thereabout,
wherein:
the at least one support disk is embodied in a double-walled manner;
the pressure surface is embodied in a double walled-manner forming a hollow interior; and
additional surfaces distributed asymmetrically over a rotational circle and positioned crosswise to a direction of flow on the at least one support disk and further comprising additional pressure surfaces arranged in planes of the pressure surfaces on sides facing away from the pressure surfaces with respect to pivot axles, wherein:
the additional pressure surfaces enlarges a leading surface area comprising the pressure surface and the additional pressure surfaces such that resistance of the pressure surfaces is increased with respect to the flowing water;
the at least one support disk is structured to have an electric current applied thereto to provide an electrolysis process through which oxygen is generated in the support disks to increase the lightness of the at least one support disk; and
the pressure surface and the additional pressure surfaces are rotatable about a pivot axle into:
(i) a first position such that an apex is facing the rotor axle of the at least one support disk and the additional pressure surfaces extend away from the rotor axle, on an opposing side of the pivot axle;
(ii) a second position such that the apex is facing away from the rotor axle of the at least one support disk and the additional pressure surfaces extend toward the rotor axle, on an opposing side of the pivot axle; and
(iii) a third position, between the first position and the second position, such that the pressure surface and one surface of the additional pressure surfaces both face the rotor axle of the at least one support disk.

20. The device according to claim 19, wherein the at least one support disk is two support disks each having a pressure surface and aligned parallel to one another and arranged at a spacing from one another.

21. The device according to claim 20, wherein the pressure surfaces of the two support disks are arranged between the two support disks via pivot axles.

22. The device according to claim 21, wherein the pivot axles are aligned perpendicular to flat extensions of the two support disks.

23. The device according to claim 21, wherein the pressure surfaces are attached to the pivot axles in a pendulum-like manner.

24. The device according to claim 19, wherein the pressure surface has a taper.

25. The device according to claim 21, further comprising stop elements arranged in radial planes between the pivot axles and the rotor axle.

26. The device according to claim 25, wherein the pivot axles of the pressure surfaces are attached by their ends to the support disks radially directed towards the rotor axle.

27. The device according to claim 1, wherein the support disks are structured to have an electric current applied thereto to provide an electrolysis process through which oxygen is generated in the support disks to increase the lightness of the support disks.

28. The device according to claim 1, wherein the pressure surfaces include two planar surfaces which are configured to converge together at an apex of a tapered shape and which are both offset from the pivot axles as they diverge from the apex.

29. The device according to claim 28, wherein an axis of rotation of the pivot axles is aligned with the additional pressure surfaces, the apex and the pivot axles.

30. The device according to claim 29, wherein the additional pressure surfaces are offset from the two planar surfaces and aligned with the apex.

31. The device according to claim 30, wherein the pressure surfaces and the additional pressure surfaces are rotatable about the pivot axles into:
(i) a first position such that the apex is facing the rotor axle of the support disks and the additional pressure surfaces extend away from the rotor axle of the support disks, on an opposing side of the pivot axles;
(ii) a second position such that the apex is facing away from the rotor axle of the support disks and the additional pressure surfaces extend toward the rotor axle of the support disks, on an opposing side of the pivot axles; and
(iii) a third position, between the first position and the second position, such that one surface of the pressure surfaces and one surface of the additional pressure surfaces both face the rotor axle of the support disks.

32. The device according to claim 31, wherein:
(i) in the first position, the pressure surfaces are closer to the rotor axle of the support disks than the additional pressure surfaces; and
(ii) in the second position, the additional pressure surfaces are closer to the rotor axle of the support disks than the pressure surfaces.

33. The device according to claim 19, wherein:
the double walled-manner of the pressure surface includes two planar surfaces configured to converge together at an apex of a tapered shape and which further rotates about a pivot axle attached to the at least one support disk; and
an axis of rotation of the pivot axle is aligned with the additional pressure surfaces, the apex and the pivot axle.

* * * * *